United States Patent
Hara et al.

(10) Patent No.: US 11,794,725 B2
(45) Date of Patent: Oct. 24, 2023

(54) TRAVEL SUPPORT SYSTEM AND CONTROL METHOD THEREOF

(71) Applicant: HONDA MOTOR CO., LTD., Tokyo (JP)

(72) Inventors: Yuki Hara, Wako (JP); Miki Tsujino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 169 days.

(21) Appl. No.: 17/099,886

(22) Filed: Nov. 17, 2020

(65) Prior Publication Data
US 2021/0179081 A1    Jun. 17, 2021

(30) Foreign Application Priority Data
Dec. 13, 2019  (JP) .................. 2019-225730

(51) Int. Cl.
*B60W 30/06* (2006.01)
*B60W 10/18* (2012.01)
*B60W 10/20* (2006.01)
*B60W 10/10* (2012.01)

(52) U.S. Cl.
CPC ............ *B60W 30/06* (2013.01); *B60W 10/18* (2013.01); *B60W 10/20* (2013.01); *B60W 10/10* (2013.01); *B60W 2520/04* (2013.01); *B60W 2710/1005* (2013.01); *B60W 2710/186* (2013.01); *B60W 2710/207* (2013.01)

(58) Field of Classification Search
CPC ...... B60W 30/06; B60W 10/18; B60W 10/20; B60W 10/10; B60W 2520/04; B60W 2710/1005; B60W 2710/186; B60W 2710/207; B62D 6/001

USPC .......................................................... 701/41
See application file for complete search history.

(56) References Cited

U.S. PATENT DOCUMENTS

| 6,070,684 A | 6/2000 | Shimizu et al. |
| 9,505,436 B2 | 11/2016 | Yamashita et al. |

(Continued)

FOREIGN PATENT DOCUMENTS

| JP | H11-034890 A | 2/1999 |
| JP | 2008-296638 A | 12/2008 |

(Continued)

OTHER PUBLICATIONS

Japanese Office Action for Japanese Patent Application No. 2019-225730 dated Jul. 30, 2021 (partially translated).

*Primary Examiner* — Jonathan M Dager
*Assistant Examiner* — Jean W Charleston
(74) *Attorney, Agent, or Firm* — Thomas | Horstemeyer, LLP

(57) ABSTRACT

The present invention provides a travel support system of a vehicle, including a detection unit configured to detect information of a periphery of the vehicle, a control unit configured to perform travel support control based on the information detected by the detection unit, and a stationary state control unit configured to cause the vehicle to be stationary at one of completion and suspension of the travel support control by the control unit, wherein the stationary state control unit performs steering control to maintain a steering angle at one of the completion and suspension of the travel support control while the vehicle is stationary.

8 Claims, 6 Drawing Sheets

(56) References Cited

U.S. PATENT DOCUMENTS

| | | | |
|---|---|---|---|
| 2016/0075375 A1* | 3/2016 | Yamashita | B62D 15/028 |
| | | | 701/41 |
| 2017/0259850 A1* | 9/2017 | Yamashita | B62D 6/00 |
| 2018/0111610 A1* | 4/2018 | Romainczyk | B60W 30/06 |
| 2018/0244312 A1* | 8/2018 | Kato | B62D 15/0285 |
| 2018/0354489 A1* | 12/2018 | Stayton | B60W 10/20 |
| 2019/0179315 A1* | 6/2019 | Marukawa | G06V 20/56 |
| 2019/0248414 A1* | 8/2019 | Ohtani | B62D 6/001 |
| 2019/0283736 A1* | 9/2019 | Watanabe | B60W 30/06 |
| 2019/0315403 A1* | 10/2019 | Irie | B62D 1/286 |

FOREIGN PATENT DOCUMENTS

| | | |
|---|---|---|
| JP | 2011-016401 A | 1/2011 |
| JP | 2016-060233 A | 4/2016 |
| JP | 2018-140757 A | 9/2018 |

\* cited by examiner

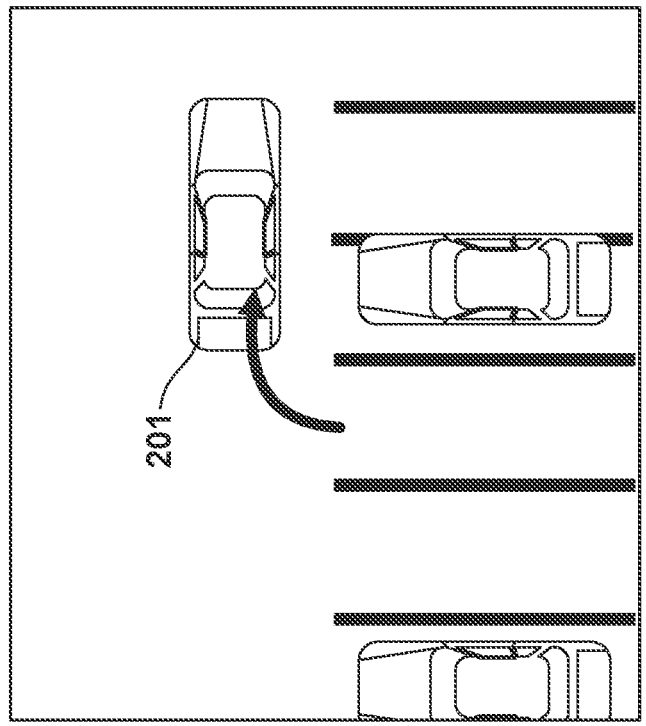
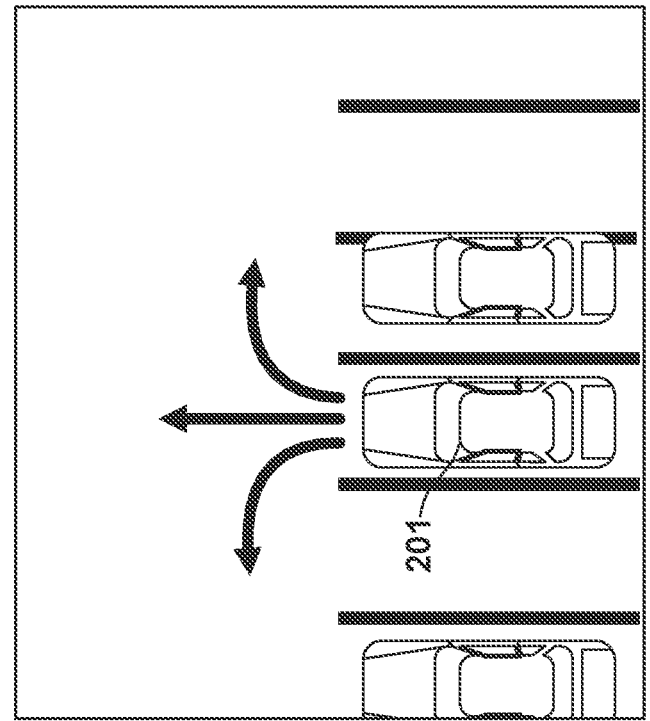

TRAVEL SUPPORT SYSTEM AND CONTROL METHOD THEREOF

CROSS-REFERENCE TO RELATED APPLICATION(S)

This application claims priority to and the benefit of Japanese Patent Application No. 2019-225730 filed on Dec. 13, 2019, the entire disclosure of which is incorporated herein by reference.

BACKGROUND OF THE INVENTION

Field of the Invention

The present invention relates to a vehicle control technique.

Description of the Related Art

Parking support control is known as a control operation of automated driving of a vehicle. Japanese Patent Laid-Open No. 2018-140757 discloses that the steering and the vehicle speed of a vehicle are controlled when the vehicle is to be parked in or is to exit from a parking space.

Japanese Patent Laid-Open No. 2018-140757 discloses that a driver can perform a brake operation, after the vehicle has been parked by parking support control of a system, to end the continuation of the stationary state of the vehicle set by the system. However, Japanese Patent Laid-Open No. 2018-140757 does not disclose the details of steering control performed when the operation subject is to be switched from the system to the driver in the stationary state of the vehicle when the vehicle has completed parking or completed exiting a parking space.

SUMMARY OF THE INVENTION

The present invention provides a technique that allows handover to a driver to be performed appropriately when the control subject is to be switched from the side of the system to the driver in a case in which the vehicle is stationary to completion or suspension of travel support control.

According to one aspect of the present invention, there is provided a travel support system of a vehicle, including a detection unit configured to detect information of a periphery of the vehicle, a control unit configured to perform travel support control based on the information detected by the detection unit, and a stationary state control unit configured to cause the vehicle to be stationary at one of completion and suspension of the travel support control by the control unit, wherein the stationary state control unit performs steering control to maintain a steering angle at one of the completion and suspension of the travel support control while the vehicle is stationary.

Further aspects of the present invention will become apparent from the following description of exemplary embodiments with reference to the attached drawings.

BRIEF DESCRIPTION OF THE DRAWINGS

FIGS. 2A and 2B are views for explaining the operation of travel support control according to the embodiment of the present invention.

DESCRIPTION OF THE EMBODIMENTS

Figure 1:
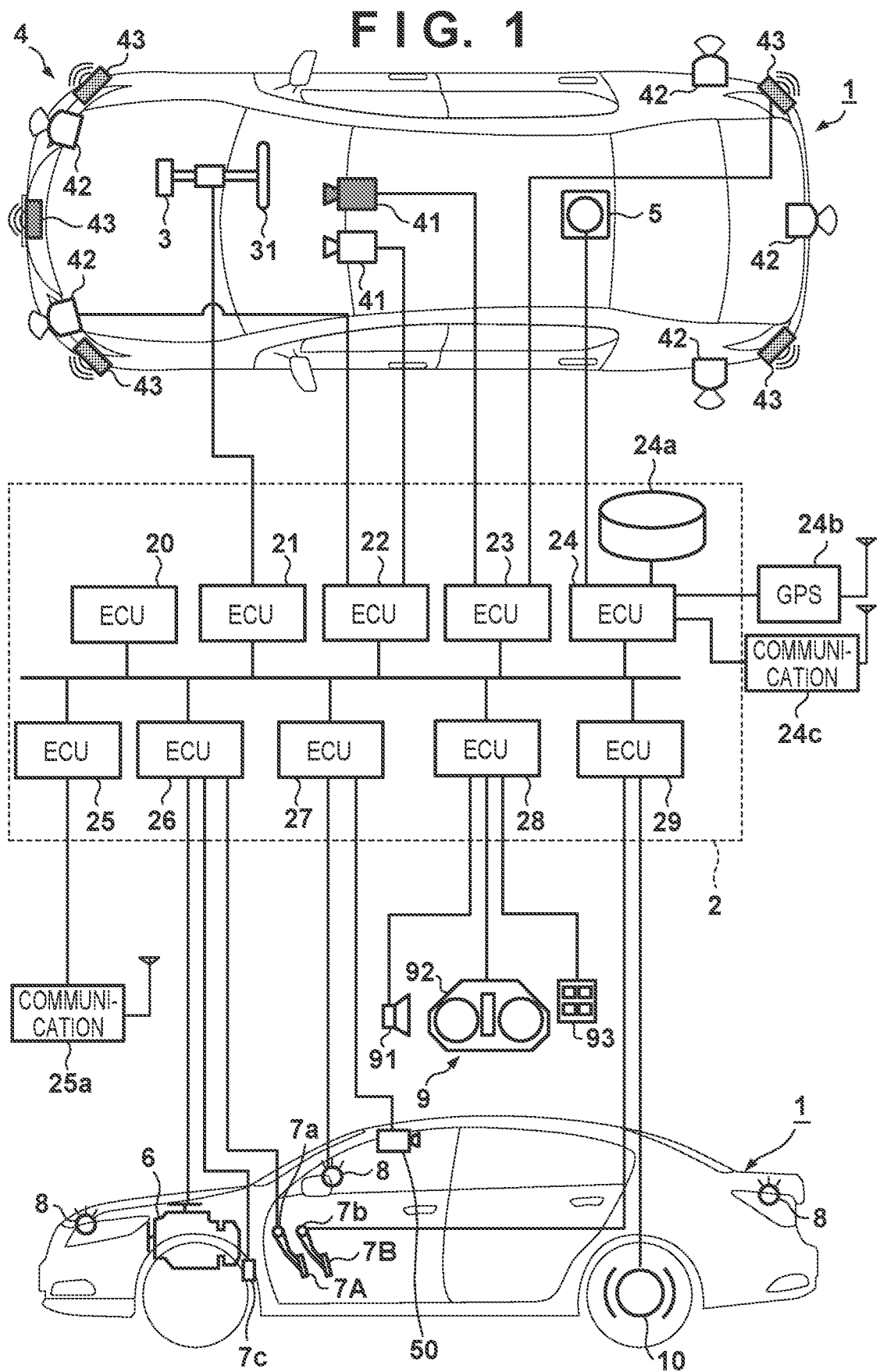
FIG. 1 is a block diagram showing a vehicle control apparatus according to an embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

[Vehicle Arrangement]

FIG. 1 is a block diagram of a vehicle control apparatus according to an embodiment of the present invention and controls a vehicle 1. FIG. 1 shows the outline of the vehicle 1 by a plan view and a side view. The vehicle 1 is, for example, a sedan-type four-wheeled vehicle.

A vehicle control apparatus of FIG. 1 includes a control system 2. The control system 2 includes a plurality of ECUs 20 to 29 communicably connected by an in-vehicle network. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can be appropriately designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled. Both steering and acceleration/deceleration are automatically controlled in the control example to be described later.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1. In addition, the ECU 21 performs control to maintain the steering angle when the vehicle 1 is stationary or when the operation subject is being switched.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the front of the roof of the vehicle 1. When images captured by the cameras 41 are analyzed, the contour of a target or a division line (a white line or the like) of a lane on a road can be extracted.

The detection unit 42 is Light Detection and Ranging (LiDAR) (to be sometimes referred to as the LiDAR 42 hereinafter), and detects a target around the vehicle 1 or measures the distance to a target. In this embodiment, five LiDARs 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion. Furthermore, although not shown in FIG. 1, the vehicle 1 can include, together with the detection units 43, sonars which use acoustic waves. The sonars are installed in a plurality of positions for detecting a target object present in each of the front, rear, and lateral positions of the vehicle 1, and can be used in the parking support control to be described later.

The ECU 22 performs control of one camera 41 and each LIDAR 42 and information processing of detection results. The ECU 23 performs control of the other camera 41 and each radar 43 and information processing of detection results. The ECUs 22 and 23 generate images of the periphery based on image data captured by the cameras 41. Images of the periphery can be, for example, a top view corresponding to a planar view of the vehicle and its periphery, a bird's-eye view corresponding to a three-dimensional image in which the vehicle and the periphery in the direction of travel of the vehicle are seen from above, and the like. Since two sets of devices that detect the peripheral state of the vehicle are provided, the reliability of detection results can be improved. In addition, since detection units of different types such as cameras, LIDARs, radars, and sonars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle in the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. The number and the type of gear ratios of the transmission are not particularly limited. For example, the park (P) range, the reverse (R) range, the neutral (N) range, and the drive (D) range are examples of gear shift positions. If the driving state of the vehicle 1 is manual driving, the gear ratio of the transmission is switched by operating a gear shifter (not shown). If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice (words). A display device 92 notifies the driver of information by displaying an image. The display device 92 is arranged, for example, in front of the driver's seat and constitutes an instrument panel or the like. Note that although notification by voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation, is used to issue an instruction to the vehicle 1, and may also include a voice input device. The arrangement of switches forming the input device 93 can be set in accordance with the functions of the vehicle 1. In addition, in this embodiment, a touch panel display that displays various kinds of images generated by the ECUs 22 and 23 is included as the input device 93.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stationary state of the vehicle 1. In addition, if the transmission of the power plant 6 includes a parking lock mechanism, it can be operated to maintain the stationary state of the vehicle 1.

The vehicle 1 further includes an in-vehicle detection unit 50 that detects the state inside the vehicle. In this case, the in-vehicle detection unit 50 is formed by a camera as an image capturing unit, a weight sensor, a temperature detection sensor, and the like, and the type of the in-vehicle detection unit is not particularly limited. Note that the in-vehicle detection unit 50 may be arranged for each seat provided in the vehicle 1 or a single in-vehicle detection unit may be arranged so that the overall state inside the vehicle can be monitored or viewed from above.

Examples of Control Functions

The control functions of the vehicle 1 according to this embodiment include traveling-associated functions associated with the control of driving, braking, and steering of the vehicle 1, and notification functions associated with the notification of information to the driver.

Examples of traveling-associated functions are lane maintenance control, lane departure suppression control (road departure suppression control), lane change control, preceding vehicle following control, collision reduction brake control, erroneous start suppression control, and parking support control. Examples of the notification functions are adjacent vehicle notification control, preceding vehicle start notification control, and peripheral target object notification control. In addition, the notification function can be executed by voice, an image, or a video or by a combination of voice, an image, and a video.

Lane maintenance control is one of control processes for the position of the vehicle with respect to a lane. This control makes the vehicle travel automatically (without depending on the driving operation of the driver) on the track of travel set in a lane. Lane departure suppression control is one of control processes for the position of the vehicle with respect to a lane. A white line or a median strip is detected, and steering is automatically performed so the vehicle will not pass across the line. Lane departure suppression control and lane maintenance control have different functions in this manner.

Lane change control is control performed to automatically move the vehicle from the lane on which the vehicle is traveling to an adjacent lane. Preceding vehicle following control is control that causes the vehicle to automatically follow another vehicle traveling ahead of the self-vehicle. Collision reduction brake control is control that supports collision avoidance by automatically braking the vehicle when the possibility of collision against an obstacle ahead of the vehicle rises. Erroneous start suppression control is control to limit acceleration of the vehicle in the stationary state of the vehicle in a case in which the acceleration operation by the driver is a predetermined amount or more, and suppresses an abrupt start.

Parking support control is control performed to specify a path of movement to a designated space (stationing position) and to automatically move the vehicle 1 along this specified path and set the vehicle in a stationary state. In this embodiment, parking space entry control, in which the vehicle is moved from a travel position to a parking position, and parking space exit control, in which the vehicle exits from the parking position to a position that allows travel, will both be described as parking support control.

Adjacent vehicle notification control is control performed to notify the driver of the presence of another vehicle traveling on the adjacent lane which is adjacent to the travel lane of the self-vehicle. The driver is notified of, for example, the presence of another vehicle traveling on a lateral side or on a rear side of the self-vehicle. Peripheral target object notification control is notification control performed when a target object is detected in the periphery of the self-vehicle. In this detection range, a target object which is present in the range of the direction of travel of the self-vehicle and in the range in which the self-vehicle intends to be positioned (intends to move) in accordance with the control contents at that point of time can be set as the notification target. These notifications can be performed by the in-vehicle notification devices described above.

[Maintenance of Steering Angle]

This embodiment describes an arrangement that maintains the steering angle at the point of the completion of travel support control to facilitate the handover of the operation subject from the system to the driver in a case in which the travel support control as described above has been completed. Although a state in which a parking space exit operation of parking support control has been completed will be exemplified as an example of travel support control here, the present invention is not limited to this. For example, another travel support control process may be set as the target of this arrangement or this arrangement may be applied when the travel support control is suspended for some reason. Note that for the sake of descriptive convenience, the steering angle which is the angle of the steering shaft and the actual steering angle which is the angle of the front wheels will be collectively referred to as the "steering angle" in this embodiment.

For example, if the maintenance of the steering angle at the point of the completion of travel support control is canceled (released) after the parking space exit operation of the parking support control has been completed, the steering angle (and the steering wheel) will return to its original position due the steering structure, torsion of an object or the vehicle axis, the state of the friction of the tires, and the like. This return can give the driver a sense of incongruity during handover and when the driver is operating the steering wheel after the handover. Also, if travel support control has been completed in a state in which the steering wheel has been turned to the left, the subsequent travel operation can be performed smoothly by maintaining the steering angle at that point of time. In other words, if the steering angle is not maintained, the steering angle at the completion of the driving support control may change, thus requiring the driver to make more effort to operate the vehicle by adjusting the steering angle and the like. In consideration of this problem described above, steering angle maintenance control is performed in this embodiment.

FIGS. 2A and 2B are views for explaining a state in which a vehicle 201 is to exit from a parking space in a parking lot or the like. In FIG. 2A, assume that the vehicle 201 is parked in a parking space and can select, as the direction of the parking space exit operation, to travel straight, to turn right, or to turn left. In the parking space exit operation of the parking support control according to this embodiment, the vehicle will automatically move from the parking position to a predetermined stationary position based on the instruction of the driver or the like.

FIG. 2B shows a state in which the parking space exit operation of the parking support control has been completed and the vehicle is stationary at the stationary position. Assume that the parking space exit operation has been completed in accordance with the driver's instruction to exit the parking space by turning right. At this point of time, the right turn has been made by rotating the steering wheel clockwise. The stationary state of the vehicle 201 is maintained at this time by, for example, controlling the brake device 10.

Figure 3A:
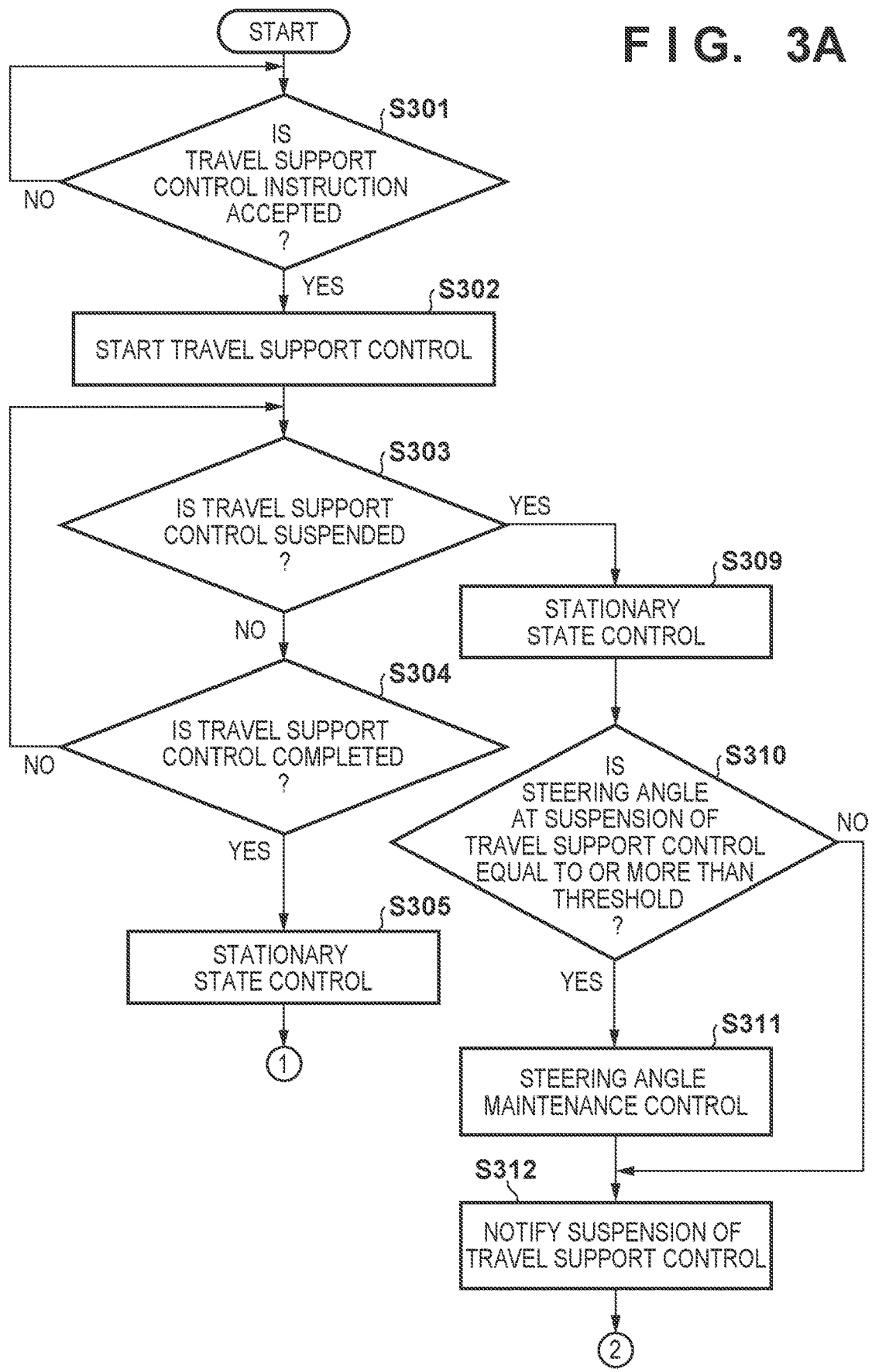
FIGS. 3A and 3B are flowcharts of processing according to the embodiment of the present invention.
Figure 3B:
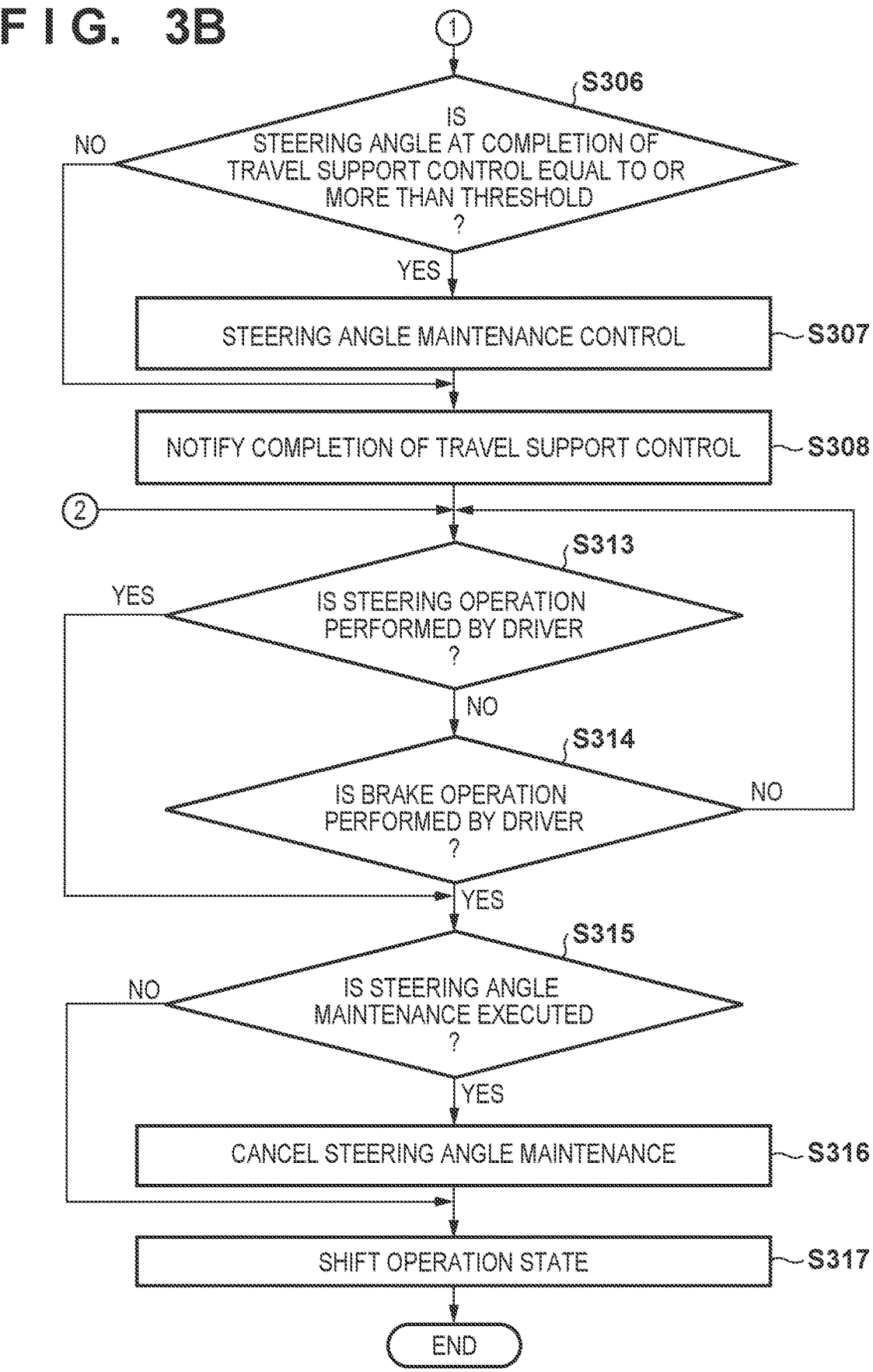

FIGS. 3A and 3B are flowcharts of the steering angle maintenance control processing according to this embodiment. Assume that the procedure of this processing is performed in cooperation by, for example, the ECUs included in the vehicle 1, and that the control system 2 which can operate as a travel support system will be generally indicated as the processing subject for the sake of descriptive convenience. Also, in this embodiment, the procedure of this processing is executed together with the travel support control of the vehicle 1.

In step S301, the control system 2 determines whether a travel support control instruction has been accepted. In this embodiment, assume that a travel support instruction is issued based on an operation by the driver. For example, a parking space exit operation instruction of the parking support control as described above can be accepted via the switches provided in the vehicle 1. If the travel support control instruction has been accepted (YES in step S301), the process advances to step S302. If the travel support control instruction has not been accepted (NO in step S301), the control system waits until an instruction is accepted.

In step S302, the control system 2 starts the travel support control based on the instruction accepted in step S301. The above-described parking support control and the like are travel support control.

In step S303, the control system 2 determines whether the currently executed travel support control has been suspended. The reason of the suspension here may be based on an instruction from a driver or may be based on the control performed on the side of the system based on a change in the peripheral environment. If the travel support control has been suspended (YES in step S303), the process advances to step S309. If the travel support control has not been suspended (NO in step S303), the process advances to step S304.

In step S304, the control system 2 determines whether travel support control has been completed. For example, in a case in which the currently executed travel support control is the parking space exit operation of the parking support control, the control system will determine whether the vehicle 1 has reached a predetermined parking space exit position. If the travel support control has been completed (YES in step S304), the process advances to step S305. If the travel support control has not been completed (NO in step S304), the process returns to step S303 and the travel support control is continued.

In step S305, the control system 2 performs stationary state control of the vehicle 1 in accordance with the completion of the travel support control. This stationary state control is performed by, for example, a brake operation on the brake device 10 and the state of the vehicle shifts to the stationary state.

In step S306, the control system 2 determines whether the steering angle at the completion of the travel support control is equal to or more than a predetermined threshold. The threshold with respect to the steering angle here will be described in detail later with reference to FIGS. 4A to 4C and FIG. 5. If the steering angle is equal to or more than the predetermined threshold (YES in step S306), the process advances to step S307. If the steering angle is less than the predetermined threshold (NO in step S306), the process advances to step S308.

In step S307, the control system 2 executes steering angle maintenance control. For example, the electric power steering device 3 is used to perform control to maintain the steering angle at the time of the completion of the travel support control. It may be arranged so that notification about the execution of the steering angle maintenance control will be performed by display by the display device 92, by voice, and the like. Subsequently, the process advances to step S312.

In step S308, the control system 2 notifies the driver of the completion of the travel support control instructed in step S301. This notification may be performed by the display device 92, by voice, or the like. Subsequently, the process advances to step S313.

In step S309, the control system 2 executes stationary state control of the vehicle 1 in accordance with the suspension of the travel support control. This stationary state control is performed by, for example, a brake operation on the brake device 10 and the state of the vehicle shifts to the stationary state. The contents of the stationary state control operations performed in the processes of steps S305 and S309 may be the same or different from each other. That is, the stationary state of a case in which the travel support control has been normally completed and the stationary state of a case in which travel support control has been suspended may be different from each other.

In step S310, the control system 2 determines whether the steering angle at the suspension of the travel support control is equal to or more than a predetermined threshold. The threshold with respect to the steering angle here will be described in detail later with reference to FIGS. 4A to 4C and FIG. 5. If the steering angle is equal to or more than the predetermined threshold (YES in step S310), the process advances to step S311. If the steering angle is less than the predetermined threshold (NO in step S310), the process advances to step S312.

In step S311, the control system 2 executes steering angle maintenance control. For example, the electric power steering device 3 is used to perform control to maintain the steering angle at the time of the suspension of the travel support control. It may be arranged so that notification about the execution of the steering angle maintenance control will be performed by display by the display device 92, by voice, and the like. Subsequently, the process advances to step S308.

In step S312, the control system 2 notifies the driver that the travel support control instructed in step S301 has been suspended for some kind of reason. The notification here may be performed by the display device 92, by voice, or the like. Subsequently, the process advances to step S313.

In step S313, the control system 2 determines the driver has performed a steering operation. The steering operation here may be a steering wheel holding operation or a steering wheel operation. If the steering operation has been performed (YES in step S313), the process advances to step S315. If the steering operation has not been performed (NO in step S313), the process advances to step S314.

In step S314, the control system 2 determines whether the driver has performed a brake operation. The brake operation here may be an operation on the brake pedal 7B or an operation on the parking brake. Alternatively, it may be an operation to change the gear shift position to the park range. In this case, the parking lock mechanism of the transmission can be used to maintain a predetermined stationary state. If the brake operation has been performed (YES in step S314), the process advances to step S315. If the brake operation has not been performed (NO in step S314), the process returns to step S313 and the control system waits for the operation by the driver while maintaining the stationary state.

In step S315, the control system 2 determines whether steering angle maintenance control is being executed based on the process of step S307 or step S311. If steering angle maintenance control is being executed (YES in step S315), the process advances to step S316. If steering angle maintenance control is not being executed (NO in step S315), the process advances to step S317.

In step S316, the control system 2 cancels the currently executed steering angle maintenance control. This cancels the restriction placed on the steering wheel operation to be performed by the driver. The stationary state can be maintained even if the steering angle maintenance control has been canceled. Note that in the steering angle maintenance control, the maintenance of the stationary state may be continued in a case in which only the steering operation by the driver has been accepted (YES step S313). On the other hand, in a case in which the driver has performed a brake operation (YES in step S314), the stationary state maintained on the side of the system can also be canceled simultaneously with the steering angle maintenance control by assuming that the braking operation has been taken over by the driver. In addition, it may be arranged so that notification about the cancellation of the steering angle maintenance control will be performed by display by the display device 92, by voice, or the like. Subsequently, the process advances to step S317.

In step S317, the control system 2 shifts the operation state based on an instruction from the driver. For example, the operation state may be switched to manual driving. Subsequently, the procedure of this processing ends.

Note that although a steering angle determination process is executed in steps S306 and S310 in the processing procedure described above, it may be arranged so that the steering angle maintenance control will be performed constantly without the execution of this determination process. That is, it may be arranged so that the steering angle maintenance control (steps S307 and S311) will be performed if the stationary state control (steps S305 and S309) has been performed. The determination processing performed in step S315 will also be omitted in the case of such an arrangement.

[Execution Determination of Steering Angle Maintenance]

Figure 4C:
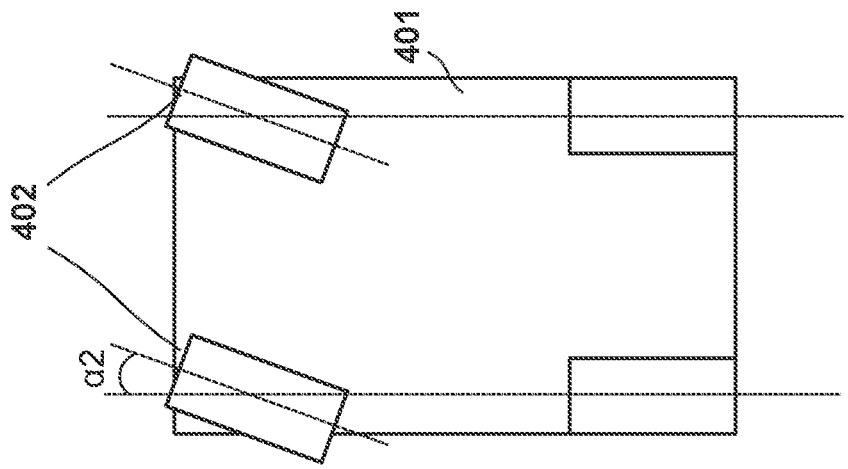
FIGS. 4A to 4C are views for explaining a threshold with respect to a steering angle according to the embodiment of the present invention.
Figure 4B:
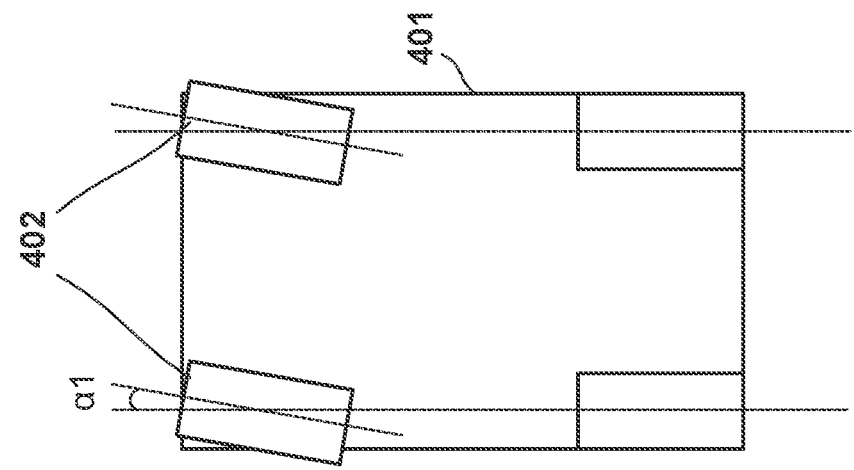
Figure 4A:
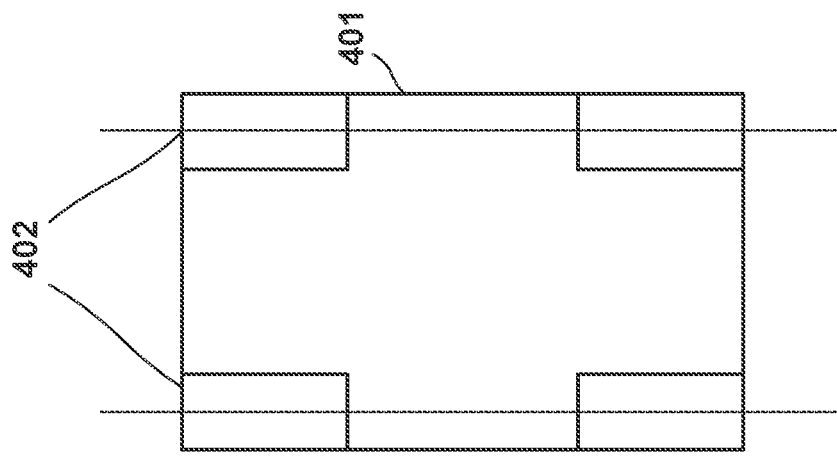

The determination processing performed in steps S306 and S310 of FIGS. 3A and 3B will be described. FIGS. 4A to 4C show states in which front wheels 402 are switched by a steering operation in a vehicle 401. FIG. 4A shows the state of the front wheels 402 when the vehicle 401 is to travel straight. Also, FIG. 4B shows a state in which the direction of the front wheels 402 is tilted to the right with respect to the front direction at an angle $\alpha 1$. FIG. 4C shows a state in which in which the direction of the front wheels 402 is tilted to the right with respect to the front direction at an angle $\alpha 2$. At this time, $\alpha 1 < \alpha 2$. In this embodiment, a threshold can be set with respect to this steering angle, and this threshold can be used in the determination processing performed in steps S306 and S310 of FIGS. 3A and 3B. For example, it may be arranged so the steering angle maintenance control will not be performed when the tilt is less than the angle $\alpha 1$, but will be performed when the tilt is equal to or more than the angle $\alpha 1$. This arrangement can be applied in a similar manner to a tilt in either the left or right direction.

Figure 5:
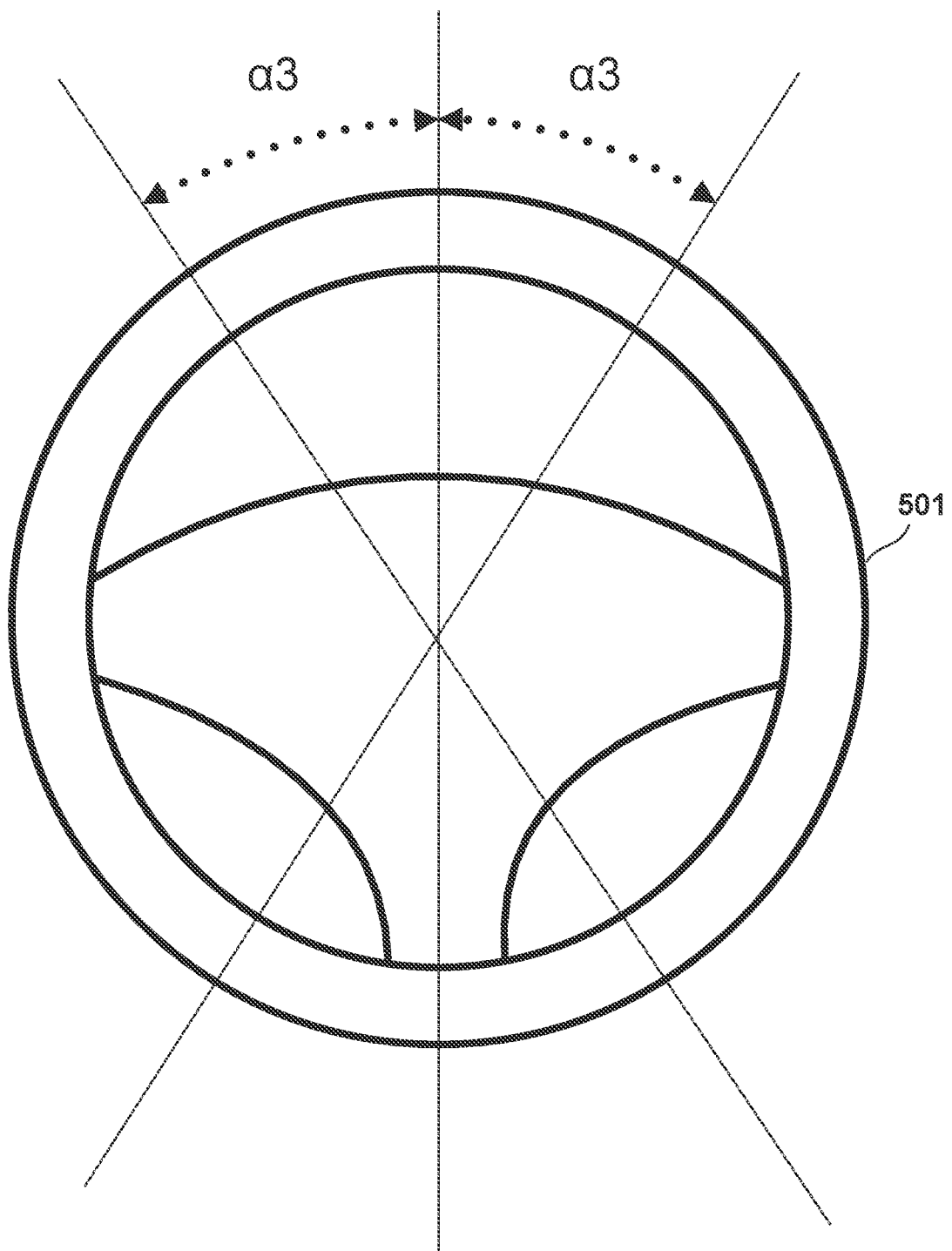
FIG. 5 is a view for explaining the threshold with respect to the steering angle according to the embodiment of the present invention.

Another example of the determination processing will be described. FIG. 5 is a view showing a schematic arrangement of a steering wheel 501 provided in the vehicle 1 according to the embodiment. The steering wheel 501 can be operated to rotate clockwise or counterclockwise. A threshold with respect to the rotation angle can be set in each of the left and right directions, and this threshold can be used in the determination processing performed in steps S306 and S310 of FIGS. 3A and 3B. For example, it may be arranged so the steering angle maintenance control will not be performed if the clockwise or counterclockwise rotation angle is less than an angle $\alpha 3$ and the steering angle maintenance control will be performed if the clockwise or counterclockwise rotation angle is equal to or more than the angle $\alpha 3$.

In addition, the threshold for the case in which the travel support control has been completed normally (step S306 of FIG. 3B) and the threshold for the case in which the travel support control has been suspended (step S310 of FIG. 3A) may be the same or different from each other. In addition, it may be arranged so that the determination will be performed by considering both the steering angle shown in FIGS. 4A to 4C and the rotation angle of the steering wheel shown in FIG. 5.

The parking space exit operation of the parking support control has been described above as an example of travel support control. On the other hand, it can be assumed that driver will not perform driving after the vehicle is stationary in the case of a parking space entry operation of the parking support control. Hence, it may be arranged so that the steering angle maintenance control will not be executed at the completion of the parking space entry operation of the parking support control. Note that even in the parking space entry operation, it may be suitable to execute steering angle maintenance control in a case in which parallel parking is to be performed. In such a case, steering angle maintenance control as described above may be performed.

In addition, although the above example described a mode (step S306 of FIG. 3B) that determines whether to execute steering angle maintenance control based on the steering angle at the completion of the travel support control, the present invention is not limited to this. For example, whether to execute the steering angle maintenance control can be determined in accordance with the contents of the stationary state control performed in step S305. For example, it may be arranged so that the steering angle maintenance control will be performed if stationary state control that maintains the stationary state by brake control is executed in the stationary state control of step S305. On the other hand, it may be arranged so the steering angle maintenance control will not be performed if control that maintains the stationary state by changing the gear shift position to the park range or by executing braking control by the parking brake is performed in the stationary state control of step S305. That is, it may be arranged so the steering angle maintenance control will not be performed in a case in which it can be expected that parking will be performed instead of traveling as the subsequent operation to be performed by the vehicle.

As described above, according to this embodiment, in a case in which the control subject is to be switched from the side of the system to the driver when parking support control has been completed, the handover to the driver can be performed appropriately. For example, the driver can start the driving operation in a state with an appropriate steering angle when the driving state is switched to manual driving.

Summary of Embodiment

1. A travel support system according to the above-described embodiment is a travel support system (for example, 2) of a vehicle (for example, 1), comprising:
a detection unit (for example, 41-43) configured to detect information of a periphery of the vehicle;

a control unit (for example, 2) configured to perform travel support control based on the information detected by the detection unit; and a stationary state control unit (for example, 2, 3) configured to cause the vehicle to be stationary at one of completion and suspension of the travel support control by the control unit, wherein the stationary state control unit performs steering control to maintain a steering angle at one of the completion and suspension of the travel support control while the vehicle is stationary.

According to this embodiment, handover to a driver can be performed appropriately when the control subject is to be switched from the side of the system to the driver in a case in which the vehicle is stationary due to completion or suspension of travel support control.

2. In the above-described embodiment, the stationary state control unit performs maintenance of the steering angle if a stationary state is maintained by brake control, and cancels the maintenance of the steering angle in a case in which the stationary state is maintained by one of a parking brake and braking by setting a gear shift in a park range.

According to this embodiment, the execution of the maintenance of the steering angle can be switched in accordance with the stationary state. For example, in the case of a state in which the driver is to operate the vehicle by switching to manual driving, the control can be transferred to the driver in an appropriate state by maintaining the steering angle. On the other hand, for example, in a case in which the vehicle is to be parked without driving from the stationary state of the vehicle, it is possible to reduce the unnecessary load of maintaining the steering angle.

3. In the above-described embodiment, the travel support control includes parking support control, and the stationary state control unit cancels the maintenance of the steering angle at the completion of a parking space entry operation of the parking support control, and performs the maintenance of the steering angle at the completion of a parking space exit operation of the parking support control.

According to this embodiment, the maintenance operation of the steering angle can be switched appropriately in accordance with the parking space exit operation/parking space entry operation of the parking support control.

4. In the above-described embodiment, in a case in which a steering operation is accepted while the vehicle is stationary, the stationary state control unit cancels the maintenance of the steering angle and causes the vehicle to stay stationary.

According to this embodiment, it is possible to appropriately transfer the steering operation to the driver while suppressing an abrupt start due to the steering operation of the driver.

5. In the above-described embodiment, the stationary state control unit determines whether to perform the maintenance of the steering angle in accordance with the steering angle at one of the completion and the suspension of the travel support control.

According to this embodiment, since whether to perform maintenance of the steering wheel is determined in accordance with the steering wheel at the completion or the suspension of the travel support control, it is possible to reduce the unnecessary load of maintaining the steering angle.

6. A control method of a travel support system according to the above-described embodiment is a control method of a travel support system (for example, 2) of a vehicle (for example, 1), the method comprising:

detecting information of a periphery of the vehicle by a detection unit (for example, 41-43);

performing travel support control based on the information detected by the detection unit; and causing the vehicle to be stationary at one of completion and suspension of the travel support control in the performing the travel support control, wherein in the causing the vehicle to be stationary, steering control is performed to maintain a steering angle at one of the completion and suspension of the travel support control while the vehicle is stationary.

According to this embodiment, handover to a driver can be performed appropriately when the control subject is to be switched from the side of the system to the driver in a case in which the vehicle is stationary due to completion or suspension of travel support control.

The invention is not limited to the foregoing embodiments, and various variations/changes are possible within the spirit of the invention.

What is claimed is:

1. A travel support system of a vehicle, comprising:
a detection unit configured to detect information of a periphery of the vehicle;
a control unit configured to perform parking support control based on the information detected by the detection unit; and
a stationary state control unit configured to cause the vehicle to be stationary at a completion of the parking support control by the control unit,
wherein the stationary state control unit:
performs steering control to maintain a steering angle at the completion of the parking support control while the vehicle is stationary, and
cancels the maintenance of the steering angle at the completion of a parking space entry operation of the parking support control, and performs the maintenance of the steering angle at the completion of a parking space exit operation of the parking support control.

2. The system according to claim 1, wherein the stationary state control unit performs maintenance of the steering angle if a stationary state is maintained by brake control, and
cancels the maintenance of the steering angle in a case in which the stationary state is maintained by one of a parking brake and braking by setting a gear shift in a park range.

3. The system according to claim 1, wherein in a case in which a steering operation is accepted while the vehicle is stationary, the stationary state control unit cancels the maintenance of the steering angle and causes the vehicle to stay stationary.

4. The system according to claim 1, wherein the stationary state control unit determines whether to perform the maintenance of the steering angle in accordance with the steering angle at one of the completion and the suspension of the parking support control.

5. A control method of a travel support system of a vehicle, the method comprising:
detecting information of a periphery of the vehicle by a detection unit;
performing parking support control based on the information detected by the detection unit; and
causing the vehicle to be stationary at a completion of the parking support control in the performing the travel support control,
wherein in the causing the vehicle to be stationary:

steering control is performed to maintain a steering angle at the completion of the parking support control while the vehicle is stationary, and the maintenance of the steering angle is canceled at the completion of a parking space entry operation of the parking support control, and the maintenance of the steering angle is performed at the completion of a parking space exit operation of the parking support control.

6. The system according to claim 1, wherein the stationary state control unit performs a notification to a driver of the vehicle when the maintenance of the steering angle is performed.

7. A travel support system of a vehicle, comprising:
a detection unit configured to detect information of a periphery of the vehicle;
a control unit configured to perform parking support control based on the information detected by the detection unit; and
a stationary state control unit configured to cause the vehicle to be stationary at a completion of the parking support control by the control unit,
wherein the stationary state control unit:
performs steering control to maintain a steering angle at the completion of the parking support control while the vehicle is stationary,
performs the maintenance of the steering angle at the completion of the parking space entry operation of the parking support control in a case of parallel parking, and cancels the maintenance of the steering angle at the completion of the parking space entry operation of the parking support control in a case of not parallel parking.

8. A control method of a travel support system of a vehicle, the method comprising:

detecting information of a periphery of the vehicle by a detection unit;

performing parking support control based on the information detected by the detection unit; and causing the vehicle to be stationary at a completion of the parking support control in the performing the travel support control, wherein in the causing the vehicle to be stationary:

steering control is performed to maintain a steering angle at the completion of the parking support control while the vehicle is stationary, the maintenance of the steering angle is performed at the completion of the parking space entry operation of the parking support control in a case of parallel parking, and the maintenance of the steering angle is canceled at the completion of the parking space entry operation of the parking support control in a case of not parallel parking.

* * * * *